United States Patent [19]

Yamada et al.

[11] 4,415,791
[45] Nov. 15, 1983

[54] BREAKTHROUGH DETECTION MEANS FOR ELECTRIC DISCHARGE MACHINING APPARATUS

[75] Inventors: Shigeo Yamada; Tamio Takawashi; Toshimitsu Sakakibara, all of Aichi, Japan

[73] Assignee: Mitsubishi Denki Kabushiki Kaisha, Tokyo, Japan

[21] Appl. No.: 347,386

[22] Filed: Feb. 9, 1982

[30] Foreign Application Priority Data

Feb. 13, 1981 [JP] Japan .................................. 56-19718
Feb. 13, 1981 [JP] Japan .................................. 56-19719
Feb. 13, 1981 [JP] Japan .................................. 56-19720

[51] Int. Cl.[3] ............................. B23P 1/02; B23P 1/14
[52] U.S. Cl. ................................ 219/69 G; 219/69 C; 219/69 S
[58] Field of Search ............... 219/69 C, 69 G, 69 M, 219/69 S; 204/129.25, 129.5, 129.55, 225

[56] References Cited

U.S. PATENT DOCUMENTS

| | | | |
|---|---|---|---|
| 3,609,279 | 9/1971 | Giesbrecht et al. | 219/69 G |
| 3,659,070 | 4/1972 | Ioffe et al. | 219/69 G |
| 3,748,427 | 7/1973 | Baldwin | 219/69 S |
| 4,107,504 | 8/1978 | Dinsdale | 219/69 G |
| 4,146,770 | 3/1979 | Dinsdale et al. | 219/69 C |
| 4,229,635 | 10/1980 | Dinsdale | 219/69 C |

*Primary Examiner*—B. A. Reynolds
*Assistant Examiner*—Alfred S. Keve
*Attorney, Agent, or Firm*—Sughrue, Mion, Zinn, Macpeak, and Seas

[57] ABSTRACT

An electric discharge machining device is provided with detecting means operable to determine when a particular machining operation, e.g. the formation of a through-hole in a workpiece, has been completed. In all cases, the position of the electrode is monitored to determine the present machining depth, and whether this depth is the largest depth thus far achieved.

The detection of an increasing machining depth is coupled with at least one other detection factor, such as electrode speed, machining fluid flow or machining fluid pressure, such that the penetration of the electrode through the workpiece can be positively sensed. In response to such an indication, a stop signal is output to the power supply unit, to end the machining operation.

18 Claims, 13 Drawing Figures

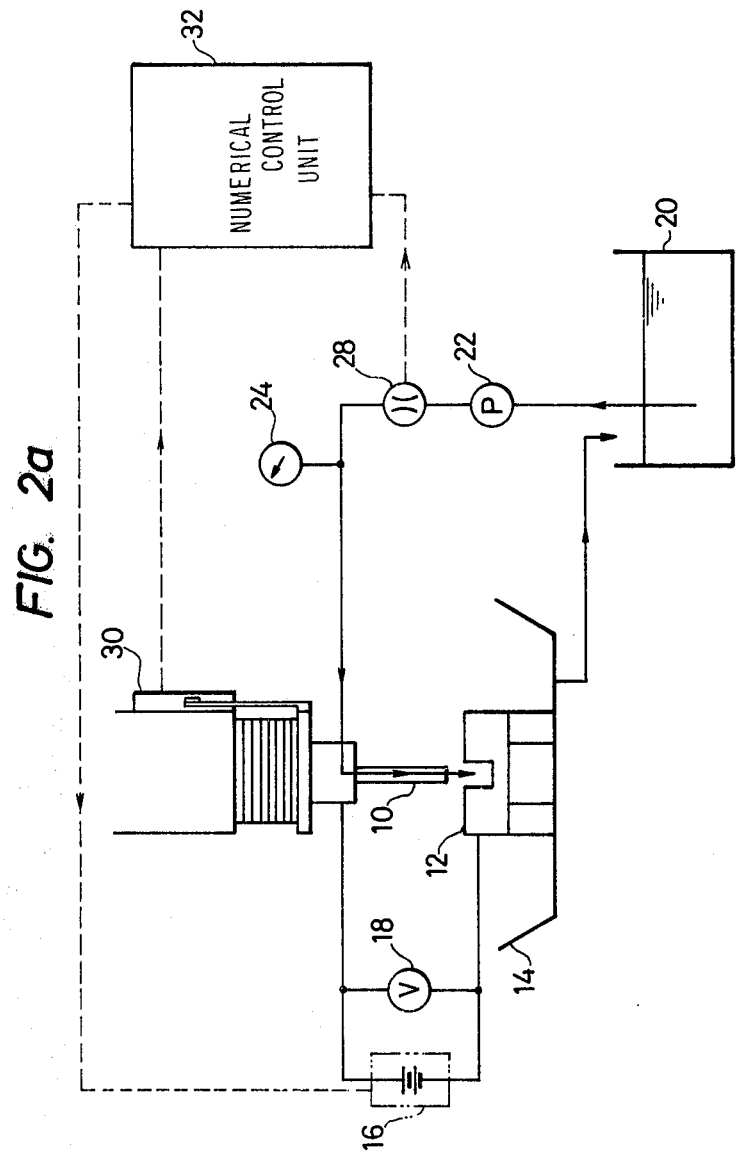

FIG. 3

| DETECTION FACTOR | | MACHINING CONDITION | | | | |
|---|---|---|---|---|---|---|
| | | IDLING | MACHINING | SHORT-CIRCUITING | PENE-TRATING | |
| DEEPEST MACHINING | OUTPUT SIGNAL H | DEEPEST MACHINING | DEEPEST MACHINING | NON-DEEPEST MACHINING | DEEPEST MACHINING | |
| | L | | | | | |
| ELECTRODE MOVEMENT SPEED | OUTPUT SIGNAL H | HIGH SPEED (IDLING SPEED) | LOW SPEED (MACHINING SPEED) | HIGH SPEED (IDLING SPEED) | HIGH SPEED (IDLING SPEED) | |
| | L | | | | | |

FIG. 3a

| DETECTION FACTOR | | MACHINING CONDITION | | | |
|---|---|---|---|---|---|
| | | IDLING | MACHINING | SHORT-CIRCUITING | PENE-TRATING |
| DEEPEST MACHINING | H | DEEPEST MACHINING | DEEPEST MACHINING | NON-DEEPEST MACHINING | DEEPEST MACHINING |
| OUTPUT SIGNAL | L | | | | |
| MACHINING SOLUTION FLOW | H | SETTING | SET FLOW | FLOW IN-CREASING | FLOW IN-CREASING |
| OUTPUT SIGNAL | L | | | | |

FIG. 3b

| DETECTION FACTOR | | MACHINING CONDITION | | | |
|---|---|---|---|---|---|
| | | IDLING | MACHINING | SHORT-CIRCUITING | PENE-TRATING |
| DEEPEST MACHINING | OUTPUT SIGNAL H | DEEPEST MACHINING | DEEPEST MACHINING | NON-DEEPEST MACHINING | DEEPEST MACHINING |
| | L | | | | |
| MACHINING SOLUTION PRESSURE | OUTPUT SIGNAL H | SETTING | SET PRESSURE | LOWERING | LOWERING |
| | L | | | | |

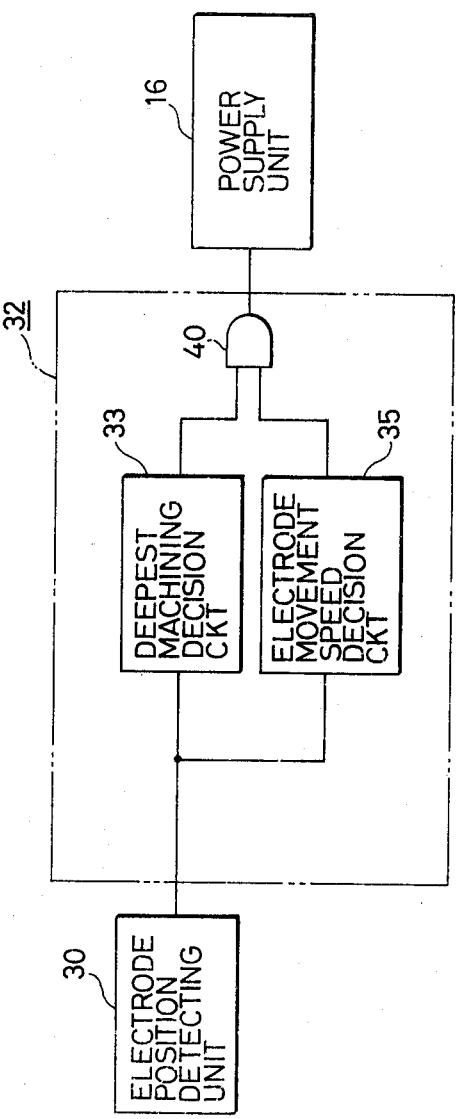

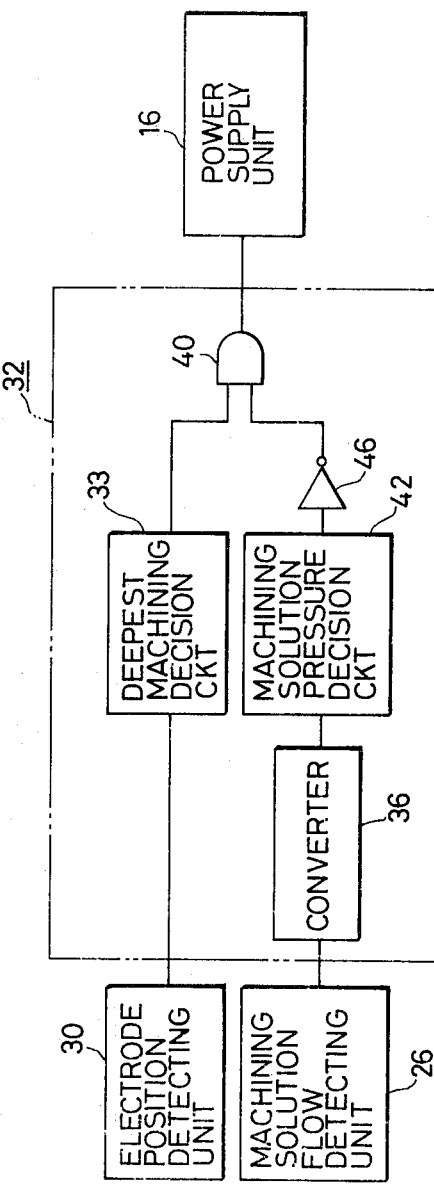

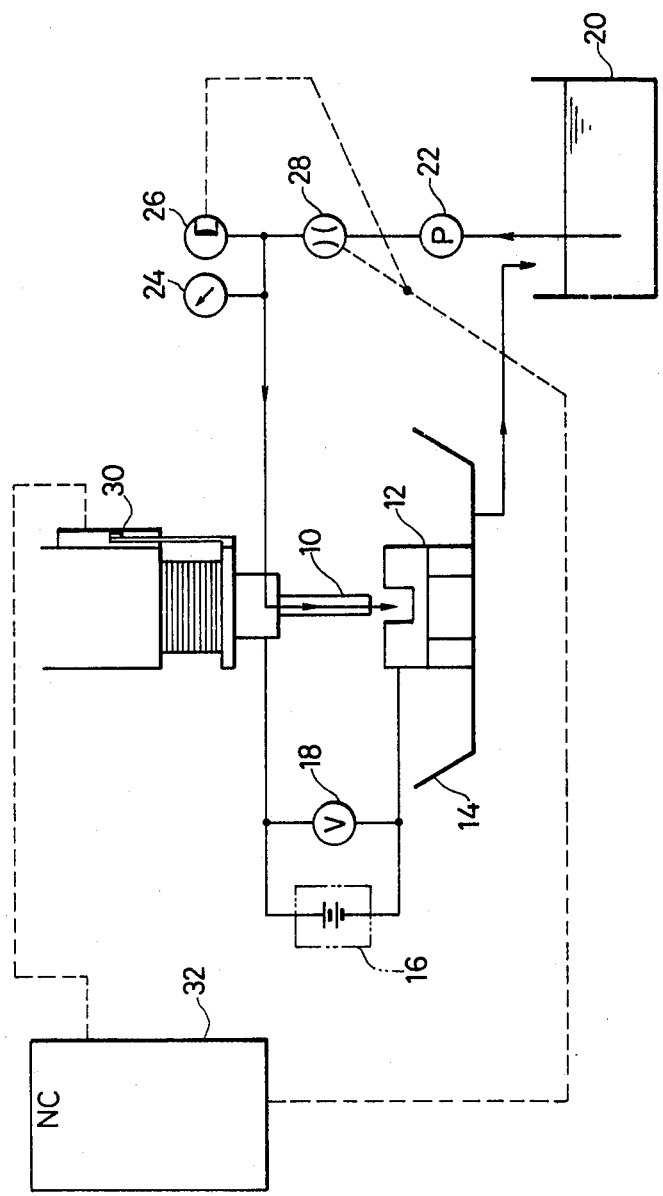

FIG. 6

| | | MACHINING CONDITION | | | |
|---|---|---|---|---|---|
| DETECTION FACTOR | | IDLING | MACHINING | SHORT-CIRCUITING | PENETRATING |
| PRIMARY DETECTION FACTOR | DEEPEST MACHINING — OUTPUT SIGNAL H | DEEPEST MACHINING | DEEPEST MACHINING | NON-DEEPEST MACHINING | DEEPEST MACHINING |
| | OUTPUT SIGNAL L | | | | |
| | ELECTRODE MOVEMENT SPEED — OUTPUT SIGNAL H | HIGH (IDLING SPEED) | | HIGH (IDLING SPEED) | HIGH (IDLING SPEED) |
| | OUTPUT SIGNAL L | | LOW (MACHINING SPEED) | | |
| AUXILIARY DETECTION FACTOR | MACHINING SOLUTION FLOW — OUTPUT SIGNAL H | SETTING | SET FLOW | FLOW INCREASING | FLOW INCREASING |
| | OUTPUT SIGNAL L | | | LOWERING | LOWERING |
| | MACHINING SOLUTION PRESSURE — OUTPUT SIGNAL H | SETTING | SET PRESSURE | | |
| | OUTPUT SIGNAL L | | | LOWERING | LOWERING |

BREAKTHROUGH DETECTION MEANS FOR ELECTRIC DISCHARGE MACHINING APPARATUS

BACKGROUND OF THE INVENTION

This invention relates to electric discharge machining apparatuses, and more particularly to an electric discharge machining apparatus for forming a through-hole in a workpiece, in which, when the electrode penetrates the workpiece, the machining operation is automatically ended.

In an electric discharge machining operation, an electrode confronts the workpiece to be machined with a gap therebetween, and an electric discharge is caused in the gap while a machining solution is supplied to the gap, to machine the workpiece as required. If an electric discharge machining apparatus is used to bore a hole in a workpiece, a trimming die having a desired configuration can be formed with high accuracy. Therefore, this method is suitable for forming various metal or other molds. However, conventional methods of forming a hole in a workpiece using electric discharge machining apparatuses are disadvantageous in the following points: Firstly, the time instant when the end of the electrode penetrates the workpiece cannot be automatically detected. Accordingly, although the hole has been formed in the workpiece, the electrode is still supplied with current to continue the electric discharge machining operation. As a result, the nominal machining time is increased by as much, and the side of the trimming die is excessively machined i.e., machining accuracy is considerably lowered. Furthermore, heretofore, in order to detect the penetration of the electrode, the amount of feed of the electrode has been merely estimated, or the operator was required to watch the movement of the electrode, during the machining operation.

FIG. 1 illustrates a conventional electric discharge machining apparatus. An electrode 10 and a workpiece 12 to be machined confront each other, with a gap therebetween, in a machining solution contained in a machining tank 14. A gap voltage is applied across the gap by a power source unit 16. The gap voltage is adjusted according to a detection value of a gap voltage detecting unit 18, so that electric discharge machining is carried out under the condition that the gap is maintained constant. The machining solution is supplied from a machining solution circulating unit 20 into the machining tank 14 by a supply pump 22. In this operation, the pressure of the machining solution is controlled according to a pressure value which is detected by a machining solution pressure gauge 24. In the conventional electric discharge machining apparatus thus constructed, while the gap between the electrode 10 and the workpiece 12 is maintained unchanged, the electrode 10 is moved in the machining direction (downwardly in FIG. 1), so that a recess or a through-hole is formed in the workpiece 12 by the electric discharge which occurs in the gap.

With the conventional apparatus described above, after the electrode 10 has penetrated the workpiece 12, the electrode 10 is further moved in the machining direction (or downwardly in FIG. 1). Accordingly, it is necessary for the operator to watch the position of the electrode 10 relative to the workpiece 12 at all times; that is, it is necessary for him to control the speed of movement of the electrode 10 with a dial gauge (not shown) or the like, so that the electrode 10 is stopped simultaneously when the workpiece has been machined. This operation is undoubtedly troublesome. On the other hand, in the case where the amount of consumption of the electrode 10 (or the amount of movement of the electrode 10) is known in advance, heretofore the following method has been employed: A dial gauge operated in association with the movement of the electrode 10 is used in combination with a limit switch, so that when the electrode 10 has moved a predetermined amount set in advance, the machining operation is automatically ended.

As described above, with the conventional electric discharge machining apparatus, the operator is required to watch the position of the electrode 10 relative to the workpiece 12 at all times, so as to detect when the electrode 10 penetrates the workpiece 12, to thereby end the machining operation. Thus, the machining operation is tedious and troublesome, and it is difficult to maintain the amount of feed of the electrode 10 constant. Furthermore, the conventional electric discharge machining apparatus is disadvantageous in that, in the case where a through-hole is formed in the workpiece with a thin electrode, the electrode is vibrated depending on the amount of feed of the electrode after the electrode has penetrated the workpiece; that is, it is not moved in a straight line after penetrating the workpiece, as a result of which the configuration of the hole thus formed is adversely affected.

In the case where the amount of consumption (or the amount of movement) of the electrode 10 is known in advance as described above, the machining operation can be ended automatically to some extent by using a dial gauge operating in association with the movement of the electrode and a limit switch (not shown). However, under the electrical conditions in an ordinary hole forming operation, the electrode 10 is greatly consumed, and therefore it is difficult to determine the amount of consumption (or movement) of the electrode 10 in advance.

As described above, in order to detect when the electrode has penetrated the workpiece to thereby end the machining operation, the operator must carry out troublesome work, which lowers work efficiency and makes it difficult to provide an automatic electric discharge machine.

SUMMARY OF THE INVENTION

In view of the above-described difficulties accompanying the conventional electric discharge machining apparatus, an object of the invention is to provide an electric discharge machining apparatus, in which the time instant when the end of the electrode penetrates the workpiece is detected, to automatically end the machining operation.

The foregoing object, and other objects of the invention have been achieved by providing an electric discharge machining apparatus in which an electrode confronts a workpiece with a gap therebetween, and electric discharge is caused to occur in the gap to thereby machine the workpiece; which machine, according to the invention, includes an electrode position detecting device for detecting the position of the electrode during machining; a decision circuit for processing an electrode position signal produced by said electrode position detecting device, to thereby detect whether or not the machining operation is at its greatest depth; and an electrode moving speed decision circuit for processing the electrode position signal from the electrode position detecting device to thereby detect the moving speed of the the electrode during the machinng operation, where the time instant when the end of the electrode penetrates the workpiece is detected from the greatest machining depth and the electrode moving speed so that the machining operation may be ended.

Further, in combination with the above or instead of the speed detecting device, the invention may be provided with a machining solution pressure detecting device for detecting the pressure of the machining solution supplied by the machining solution circulating device; and a machining solution pressure decision circuit for determining the pressure of the machining solution, where the time instant when the end of the electrode penetrates said workpiece is detected from thhe greatest machining depth state and the machining solution pressure so that the machining operation may be ended.

Alternatively, or in addition, the device of the invention may be provided with a machining solution flow detecting device for measuring the supply flow of the machining solution; and a machining solution flow decision circuit for determining the flow of the machining solution during the machining operation, where the time instant when an end of the electrode penetrates the workpiece is detected from the greatest machining depth state and the machining solution flow, so that the machining operation may be ended.

The preferred embodiments of this invention will be described with reference to the accompanying drawings.

BRIEF DESCRIPTION OF THE DRAWINGS

FIGS. 3-3b are explanatory diagrams showing output signals from which various operating conditions are detected in the embodiments of FIGS. 2a-2c, respectively;

FIG. 5 illustrates a further embodiment of the invention expanding upon and combining features from the prior embodiments;

FIG. 6 is a diagram for illustrating various output signals of the device; and

DETAILED DESCRIPTION OF THE PREFERRED EMBODIMENTS

Figure 1:
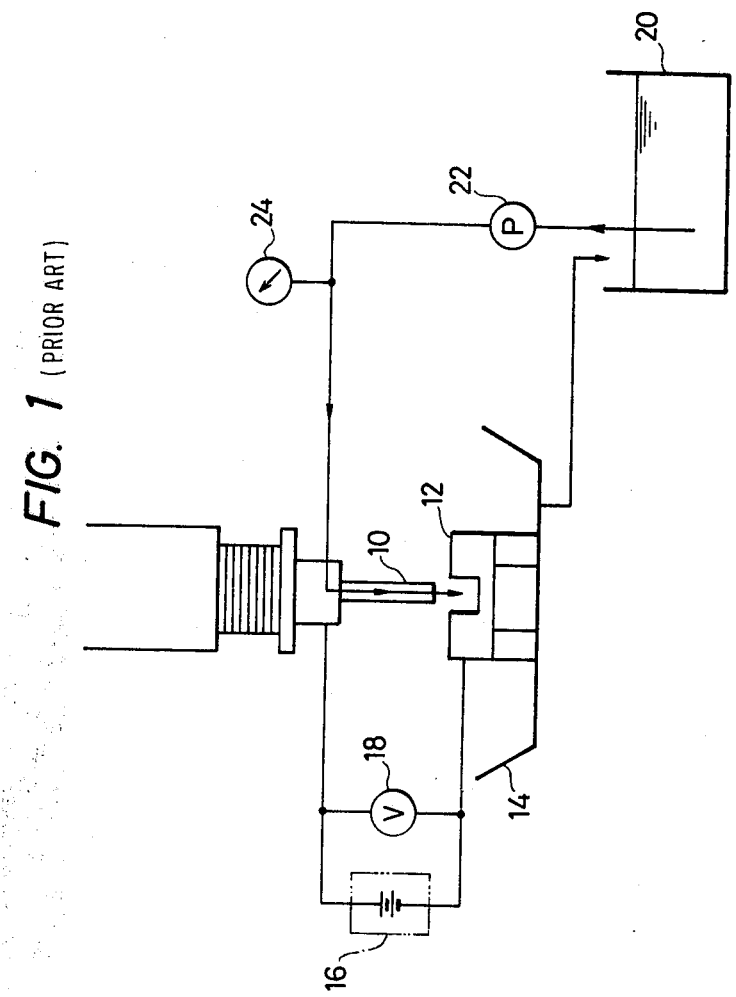
FIG. 1 is an explanatory diagram illustrating a conventional electric discharge machining apparatus.
Figure 2:
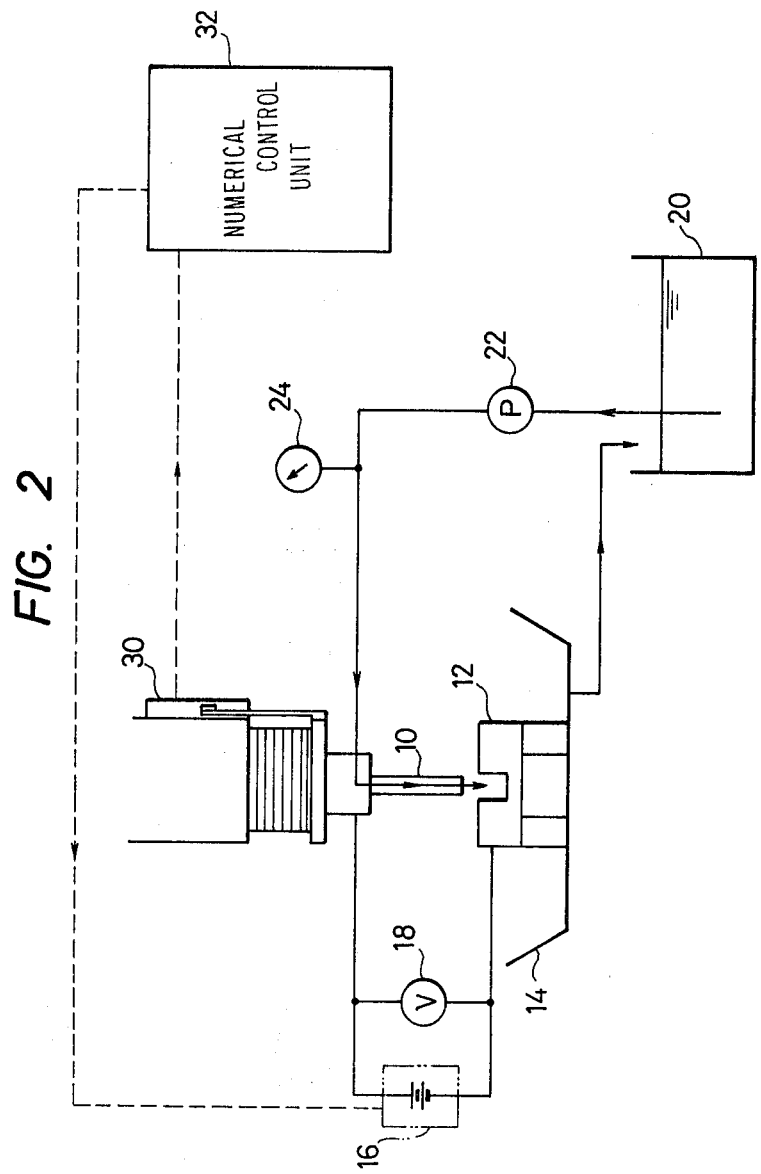
FIGS. 2-2b are explanatory diagrams illustrating an electric discharge machining apparatus according to three similar embodiments of the present invention.
Figure 2B:
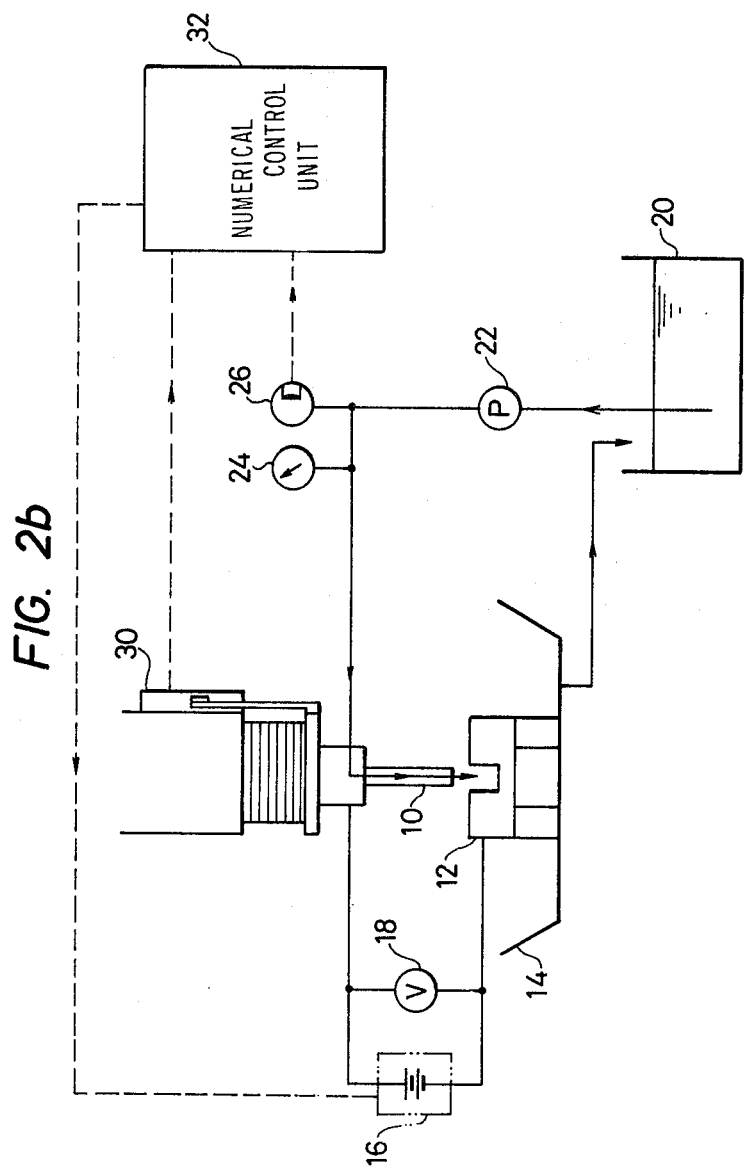

FIG. 2 shows a first electic discharge machining apparatus according to the invention. In FIG. 2, those components which have been previously described with reference to FIG. 1, which shows the conventional discharge machine, are similarly numbered, and therefore detailed description of these items will be omitted.

The invention has been developed from the fact that, when various machining conditions take place during the electric discharge machining operation, various machining conditions are accompanied by special characteristics which may be electrically detected, such as when the electrode penetrates the workpiece, and therefore the penetration of the electrode can be automatically detected. According to one aspect of the invention, for this purpose, the greatest machining depth and the moving speed of the electrode are selected.

In the invention, the first factor for detecting when the electrode penetrates the workpiece is the detection of the greatest machining depth. In order to detect whether or not a given machining operation is of the greatest machining depth, an electrode position detecting unit 30 and a greatest machining depth decision circuit 33 are provided as shown in FIG. 4. The term "greatest machining depth" as used herein is intended to mean that the electrode 10 carries out the machining operation at the maximum depth (which is the deepest position at which the electrode 10 carries out the machining operation for a period of time from the machining start time to a certain time instant). Since the electrode 10 is slightly vibrated vertically during the machining operation, the electrode does not constantly exceed the previous maximum depth for relatively short periods of time. However, this machining, regardless of the vibration, is still regarded as the deepest machining.

For the various operating conditions (idling, machining, short-circuiting and penetrating conditions), the greatest machining depth and the corresponding output signals are as shown in FIG. 3.

In this embodiment, according to whether or not the greatest depth machining is carried out, an output signal at a high or low logic level (hereinafter referred to merely as "H" or "L", respectively, when applicable) is provided.

In this embodiment, the electrode position is utilized to detect whether or not machining is being carried out at the largest depth. The electrode position detecting unit 30 detects the position of the electrode 10 to output a position signal which is applied to the machining depth decision circuit 33. In the circuit 33, the position signal is processed to determine whether or not a given machining operation is the deepest thus far. The circuit 33 operates to output an "H" signal if this machining operation is the deepest, and an "L" signal is not. Now, the output signal which is provided when the deepest machining is carried out in each operating condition will be described.

In the idling condition before machining begins, in which the electrode 10 approaches the machining position of the workpiece 12, the electrode 10 is moved downwardly and therefore it continuously carries out the "deepest machining". Therefore, in the idling condition, the output signal is maintained at "H".

In the machining condition, wherein the electrode 10 is moved near the workpiece 12 with a predetermined gap therebetween and electric discharge machining is carried out, the electrode 10 is moved downwardly while vibrating vertically, and therefore it again carries out the "deepest machining". Thus, in the ordinarly machining condition, the output signal is maintained at "H".

In a short-circuiting condition, the electrode 10 will have been abnormally brought into contact with the workpiece 12. In order to eliminate the short-circuit condition, the electrode 10 is moved upwardly by a short-circuit eliminating circuit (not shown). After the electrode 10 is moved away from the workpiece 12 to eliminate the short-circuit condition, it is moved downwardly again to perform the ordinary machining operation. In the short-circuit condition, the electrode 10 does not carry out machining at the greatest depth since it is retracted upwardly from the position where it was brought into contact with the workpiece. Therefore, the output signal level is changed to "L", and it is maintained at "L" during the above-described operation.

The electrode will penetrate the workpiece 12 just before the end of the machining operation, and will be further moved downwardly; that is, the electrode at this point will be at its greatest depth. Thus, in this condition, the output signal is maintained at "H".

Machining in the various operating conditions (idling, machining, short-circuiting and penetrating conditions) and the corresponding output signals are as described above. As described above, in the short-circuit condition, the output signal changes to "L" because of the upward movement, while in the penetrating condition the output signal returns to "H", similarly as in the machining and idling conditions. Therefore, the short-circuit condition can be readily distinguished from the penetrating, idling and normal machining conditions.

As described above, the short-circuit condition can be distinguished from the penetrating, idling and machining conditions according to the "deepest machining" signal. However, the fact that the electrode penetrates the workpiece, cannot be detected from only this first factor. In order to discriminate the penetrating condition and the machining condition, another factor different from the machining depth is employed.

One second factor which may be used for detecting the penetration of the electrode in the invention is the electrode movement speed. In order to electrically detect the electrode movement speed, an electrode position detecting unit 30 and an electrode movement speed decision circuit 35 are provided as shown in FIG. 4.

The electrode movement speeds and the corresponding output signals for the various operating conditions (idling, machining, short-circuiting and penetrating conditions) are as indicated in FIG. 5.

In this embodiment, two kind of output signals, namely "H" and "L" output signals, are provided according to the electrode movement speed (e.g. high or low speeds), respectively.

In this embodiment, the electrode position is utilized to detect the electrode movement speed. The electrode position detecting unit 30 detects the position of the electrode 10 to output a position signal which is applied to the electrode movement speed decision circuit 35, where the position signal is processed to determine the electrode movement speed. Thus, the circuit 35 outputs the "H" signal when the electrode movement speed is high, and the "L" signal when the speed is low. Now, the output signals which are provided in response to the electrode movement speeds in the various operating conditions will be described.

In the idling condition, the gap between the electrode 10 and the workpiece 12 is large, and therefore the electrode is moved downwardly at high speed. Thus, during the idling condition, the output signal is at "H".

During the machining operation, the electrode 10 is moved downwardly at a low speed while machining is performed. Thus, during the machining operation, the output signal is maintained at "L".

In the short-circuit condition, the electrode 10 is in contact with the workpiece 12. In order to eliminate the short-circuit condition, the electrode is retracted upwardly at high speed and is then again moved downwardly at high speed. Thus, in the short-circuit condition, the output signal is maintained at "H".

In the penetrating condition, the electrode 10 penetrates the workpiece at high speed and is then further moved downwardly at high speed. Thus, in the penetrating condition, the output signal is maintained at "H".

The electrode movement speeds and the corresponding output signals in the various operating conditions (the idling, machining, short-circuiting and penetrating conditions) are as described above. In the machining condition, the output signal is at "L" because of the low speed whereas in the penetrating condition, the output signal is at "H", similarly as in the idling and short-circuit conditions. Thus, the penetrating condition can be readily distinguished from machining and other conditions according to this second factor.

The output signal of the machining depth decision circuit 33 and the output signal of the electrode movement speed decision circuit 35 are applied to an AND circuit 40. Only when both the output signals are at "H" does the AND circuit 40 apply a stop signal to the power supply unit 16, so that the application of power may be suspended to stop the machining operation.

In the idling condition, the output signal of the machining depth decision circuit 33 and the output signal of the electrode movement speed decision circuit 35 are at "H". However, the present electic discharge machining apparatus is so set that, in the idling condition, the AND gate 40 provides no stop signal to the power supply unit 16.

In the machining condition, the output signal of the machining depth decision circuit 33 is at "H" and the output signal of the electrode movement speed decision circuit 35 is at "L". Therefore, the AND circuit 40 outputs no stop signal.

In the short-circuit condition, the output signal of the machining depth decision circuit 33 is at "L", and the output signal of the electrode movement speed decision circuit 35 is at "H". Therefore, the AND circuit 40 outputs no stop signal.

In the penetrating condition, since the output signal of the machining depth decision circuit 33 and the output signal of the electrode movement speed decision circuit 35 are both at "H", the AND circuit 40 applies the stop signal to the power supply unit 16 so that the application of power is suspended, to thereby stop the machining operation.

As is apparent from the above-description, in the electric discharge machining apparatus according to the invention, the time instant when the end of the electrode 10 penetrates the workpiece 12 is detected so that the machining operation may be automatically stopped.

In the embodiment of FIG. 4, the machining depth decision circuit 33, the electrode movement speed decision circuit 35 and the AND gate 40 are shown included in a numerical control unit 32; however, they may be separated from the numerical control unit 32, i.e., they may be provided individually.

If, when the penetration of the electrode is detected, the electrode 10 is further moved a predetermined distance in the direction of the greatest machining depth (or downwardly in FIG. 2) before the machining operation is ended, then the adverse effect due to the consumption of the electrode 10 can be eliminated. In an electric discharge machining operation, as the workpiece is machined, only the end portion of the electrode 10 is consumed and thus becomes thin. Therefore, if the machining operation is ended immediately when the end of the electrode 10 penetrates the workpiece 12, then the size of the through-hole formed in the workpiece 12 is smaller than that desired. In view of the above, in this embodiment of the invention, the electrode 10 may be moved until that portion of the electrode 10, the dimension of which is maintained unchanged, penetrates the workpiece, so that a correctly sized through-hole is obtained at all times.

During the idling condition of the electrode 10 before an electric discharge takes place, as shown in FIG. 3, the output signal is at "H", similarly as in the case of electrode penetration. In order to inhibit the application of this output signal to the power supply unit 16, the electrode movement speed decision circuit 35 may be designed so as not to be placed in an operating state immediately upon the electric discharge machining start switch being turned on, but rather so as to be placed in an operating state when machining is started, i.e., when the electrode movement speed is changed to a low speed level (in other words, when the electric discharge takes place). Alternatively, a detection circuit for detecting at least one of the gap voltage, the average machining current or the average machining voltage may be provided, and the circuit 35 may be designed so as to be placed in an operating state only upon the detected value being higher than a value at the idling condition. The operating state is thereafter maintained until a machining completion signal is produced.

Figure 4A:
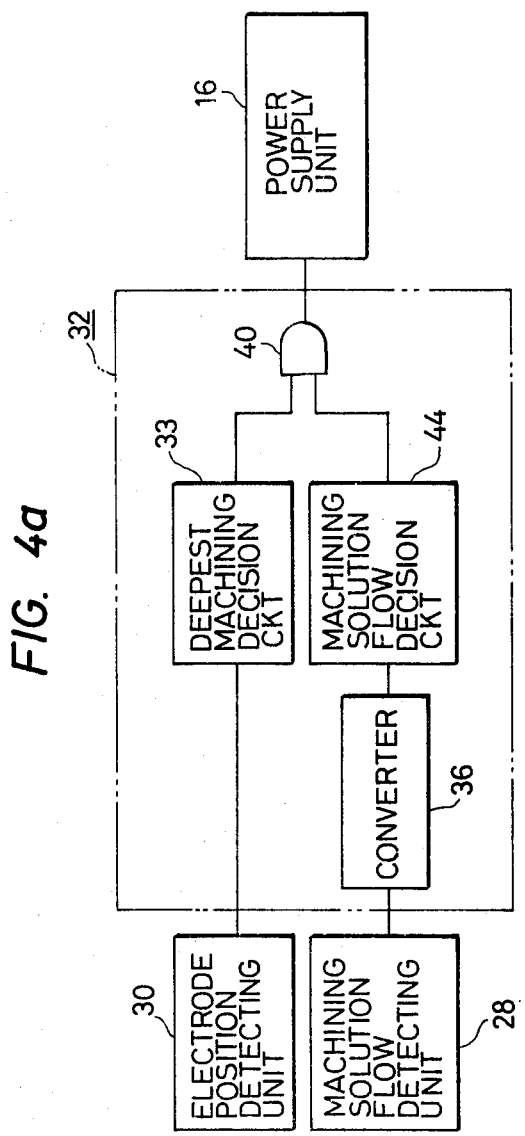
FIGS. 4-4b are circuit diagrams illustrating circuits for detecting when an electrode of the apparatus of the invention penetrates the workpiece, for use with the embodiments of FIGS. 2a-2c.

As noted previously, the electrode speed is only one additional factor which may be detected, along with the largest machining depth, to enable automatic operation of the device. Alternatively, or in addition, the second control factor may include the detection of the flow of the machining solution. To this end, a machining solution flow detecting unit 28, a converter 36 and a machining solution flow decision circuit 44 may be provided as shown in FIG. 4a.

The machining solution flow and the corresponding output signals in the various operating conditions are as indicated in FIG. 3a.

In this embodiment, output signals "H" and "L" are provided according to the machining solution flow (high or low flow), respectively.

The machining solution flow detecting unit 28 (FIG. 2a) detects the flow of the machining solution supplied. The flow thus detected is subjected to a predetermined conversion in a converter 36 and is then applied to the machining solution flow decision circuit 44, where the flow of the machining solution is determined. If the flow is at a set value, the circuit 44 outputs an "L" signal, and if it is higher than the set flow, the circuit 44a outputs an "H" signal.

In the idling condition, the flow of the machining solution is being adjusted; that is, it is adjusted to the set flow before machining is started. In the idling condition, therefore, the machining solution flow decision circuit 44 provides no output signal.

In the machining condition, machining solution is supplied into the gap between the electrode 10 and the workpiece 12, the flow of the machining solution being equal to the set flow. Therefore, the machining solution flow decision circuit 44 outputs the "L" signal. In the short-circuit condition, the electrode 10 is brought into contact with the workpiece 12 and is immediately retracted upwardly. During this operation, the gap between the electrode 10 and the workpiece 12 is greatly increased, as a result of which the machining solution flow is increased. Accordingly, the machining solution flow decision circuit 44 outputs the "H" signal.

In the penetrating condition, the electrode 10 is moved downwardly and the gap is eliminated, and accordingly the machining solution flow is increased. Therefore, the machining solution flow decision circuit 44 outputs the "H" signal.

The machining solution flow and the output signals corresponding thereto in the various operating conditions (idling, machining, short-circuiting and penetrating) are as described above. The output signal of the circuit 44 is at "L" in the machining condition, and it is at "H" in the short-circuiting or penetrating condition. Therefore, the machining condition and the penetrating condition can be readily distinguished from one other by this second factor.

The output signal of the machining depth decision circuit 33 and the output signal of the machining solution flow decision circuit 44 are applied to an AND circuit 40. Only when both the output signals are at "H" will the AND circuit 40 apply a stop signal to the power supply unit 16 to suspend the application of power to stop the machining operation.

Now, the operation of the AND circuit 40 in the various operating conditions (idling, machining, short-circuiting and penetrating) will be described.

In the idling condition, the output signal of the deepest machining decision circuit 33 is at "H" whereas the machining solution flow decision circuit 44 produces no output signal. Therefore, the AND gate 40 provides no stop signal.

In the machining condition, the output signal of the machining depth decision circuit 33 is at "H" and the output signal of the machining solution flow decision circuit 44 is at "L". Therefore, the AND circuit 40 outputs no stop signal.

In the short-circuiting condition, the output signal of the machining depth decision circuit 33 is at "L", and the output signal of the machining solution flow decision circuit 44 is at "H". Therefore, the AND circuit 40 outputs no stop signal.

In the penetrating condition, since the output signal of the machining depth decision circuit 44 and the output signal of the machining solution flow decision circuit 44 are both at "H", the AND circuit 40 applies the stop signal to the power supply unit 16 so that the application of power may be suspended to thereby stop the machining operation.

As is apparent from the above description, in the electric discharge machining apparatus according to the invention, the time instant when the end of the electrode 10 penetrates the workpiece 12 is detected to that the machining operation is automatically stopped.

In the embodiment of FIG. 4a, the deepest machining decision circuit 33, the converter 36, the machining solution flow decision circuit 44 and the AND gate 40 are illustrated as being included in a numerical control unit 32; however, they may be separated from the numerical control unit 32, i.e., they may be provided individually.

As a further alternative or additional detection factor, the machining solution pressure may be detected as an aid to determining the time of electrode penetration. To this end, a machining solution detecting unit 26, a converter 36, a machining solution pressure decision circuit 42 and an inverter 46 may be provided as shown in FIG. 4b.

The machining solution pressure and the corresponding output signals in the various operating conditions (idling, machining, short-circuiting and penetrating) are as indicated in FIG. 3b.

The machining solution pressure detecting unit 26 detects the pressure of the supplied machining solution. The pressure thus detected is subjected to a predetermined conversion in the converter 36, and is then applied to the machining solution pressure decision circuit 42, where the pressure of the machining solution is determined. If the pressure is at a set pressure, the circuit 42 outputs an "H" signal, and if it is lower than the set pressure, the circuit 42 outputs an "L" signal. The output signal from the machining solution pressure decision circuit 42 is supplied to an inverter 46 to be inverted. The output of the inverter 46 provided for each of the various operating conditions will now be described.

In the idling condition, prior to the start of machining, the pressure of the machining solution is being adjusted to the set pressure. In the idling condition, therefore, the machining solution pressure decision circuit provides no output signal.

In the machining condition, the machining solution is supplied into the gap between the electrode 10 and the workpiece 12, the pressure of the machining solution being equal to the set pressure. Therefore, the machining solution pressure decision circuit 42 outputs the "H" signal. Thus, in the machining condiiton, the inverter 46 outputs the "L" signal continuously.

In the short-circuit condition, the electrode 10 is brought into contact with the workpiece 12 and is then immediately retracted upwardly. Then, the electrode 10 is again moved downwardly. During this operation, the gap between the electrode 10 and the workpiece 12 is greatly increased, as a result of which the machining solution pressure is decreased. Accordingly, the machining solution pressure decision circuit 42 outputs the "L" signal. Thus, in the short-circuit condition, the inverter 46 outputs the "H" signal.

In the penetrating condition, the electrode 10 is moved downwardly and the gap is eliminated, and accordingly the machining solution pressure is decreased. Therefore, the machining solution pressure decision circuit 42 outputs the "L" signal. Thus, in the penetrating condition, the inverter 46 outputs the "H" signal.

The machining solution pressures and the output signals corresponding thereto in the various operating conditions (idling, machining, short-circuiting and penetrating conditions) are as described above and shown in FIG. 3b. The output signal of the inverter 46 is at "L" in the machining condition, and it is at "H" in the short-circuiting or penetrating condition. Therefore, the machining condition and the penetrating condition can be readily distinguished from one other.

The output signal of the machining depth decision circuit 33 and the output signal of the inverter 46 are applied to an AND circuit 40. Only when both the output signals are at "H" will the AND circuit 40 apply a stop signal to the power supply unit 16 so as to suspend the application of power to stop the machining operation.

In the idling condition, the output signal of the machining depth decision circuit 33 is at "H", whereas the inverter 46 provides no output signal. Therefore, the AND gate 40 provides no stop signal.

In the machining condition, the output signal of the machining depth decision circuit 33 is at "H" and the output signal of the inverter 46 is at "L". Therefore, the AND circuit 40 outputs no stop signal.

In the stop-circuiting condition, the output signal of the machining depth decision circuit 44 is at "L", and the output signal of the inverter 46 is at "H". Therefore, the AND circuit 40 outputs no stop signal.

In the penetrating condition, since the output signal of the machining depth decision circuit 33 and the output signal of the inverter 46 are both at "H", the AND circuit 40 applies the stop signal to the power supply unit 16 to thereby stop the machining operation.

In an embodiment of FIG. 4, the machining depth decision circuit 33, the converter 36, the machining solution pressure decision circuit 42, the inverter 46 and the AND gate 40 are shown as included within a numerical control unit 32; however, they may be separated from the numerical control unit 32, i.e., they may be provided individually.

Figure 7:
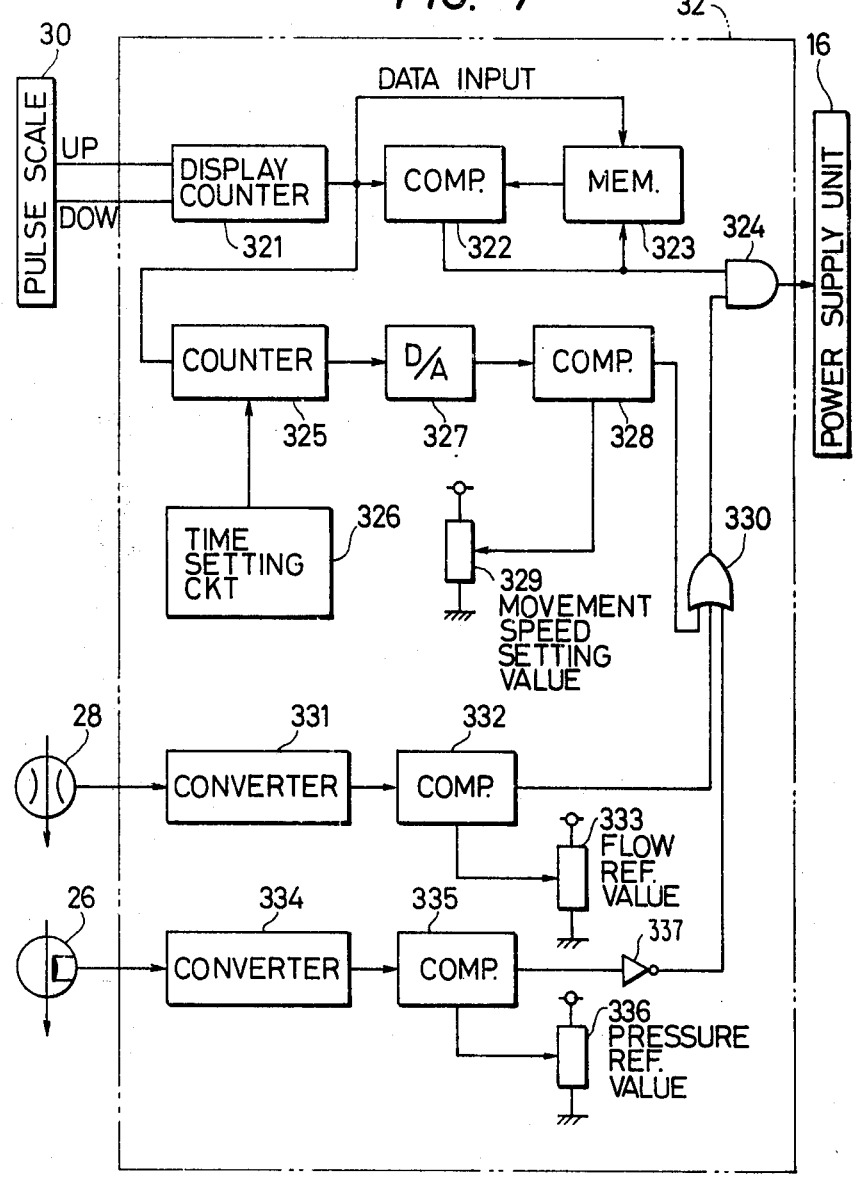
FIG. 7 is a circuit diagram illustrating a circuit for use in the embodiment of FIG. 5, for detecting electrode penetration.

A further embodiment is illustrated in FIGS. 5-7, which combines several features from the previous embodiments such that the four factors noted above (e.g. greatest machining depth, electrode speed, machining fluid flow and machining fluid pressure) may be simultaneously detected. Referring now to FIG. 5, the present position of the electrode is detected, as previously, by an electrode position detector 30, which may be in the form of a pulse scale 30 which operates to produce an up-down signal. The signal is processed by a display counter 321 to display the present position. The content of the counter 321, which represents the deepest machining position, is stored in a memory. Thereafter, this stored value is successively compared with the output signal of the counter 321 in a comparator 322 to reset the deepest machining position. In this case, if the signal representative of the present position is higher than the stored value, the data stored in the memory 323 is replaced by the present position signal, and the comparator 322 outputs an "H" level signal to an AND gate 324.

The content of the display counter 321 is shifted to a counter 325 every 1 to 5 seconds, the time interval being present by a time setting circuit 326, and then the content of the counter 325 is subjected to digital-to-analog conversion in a D/A converter 327 to be applied to a comparator 328. In the comparator 328, the signal is compared with a predetermined movement speed value. In the case where the signal is larger than the predetermined value, the comparator 328 produces a "H" level signal through an OR gate 330 to the AND gate 324, to indicate the high movement speed of the electrode.

The machining solution flow is measured by the flow measuring device 28. The output signal representing the measured flow is converted to a desired signal in a converter 331. Then, the converted signal is compared with a reference value, derived from flow reference value 333, in a comparator 332. In the case of the converted signal being larger, the comparator 332 produces an "H" level signal which is directed to the AND gate 324.

The machining solution pressure is measured by the pressure meter 26. The detected pressure signal is converted into a desired signal in a converter 334 to be compared with a reference signal, derived from the pressure reference valve 336, in a comparator 335. In the case of the signal being smaller than the reference signal, the comparator 335 produces an "L" level signal. As before, an inverter 337 follows comparator 335.

In the above described embodiment, the greatest machining depth state is employed as a primary detection factor for detecting the penetration of the electrode whereas the other factors, e.g. the movement speed, the machining solution flow and the machining solution pressure are each employed as auxiliary detection factors. Thus, the outputs of the comparators 328, 332 and 335 are applied through the OR gate 330 to the AND gate 324.

However, provided that the outputs of the comparators 328, 332 and 335 are directly applied to the AND gate 324, these auxiliary detection factors can be employed as a primary detection factor similarly to the greatest machining depth state.

It should be noted that when the "H" level signal is applied to the power source unit 16, the power supply between the workpiece and the electrode is suspended to terminate the machining process. The various outputs of the comparators 322, 328, 332 and 335 are illustrated in the chart of FIG. 6, which, it will be noted, is merely a compilation of the information given in FIGS. 3, 3a and 3b. Also in FIG. 7, a detection circuit for detecting the average machining voltage, machining current, etc, may be added, as discussed previously, to inhibit an erroneous stop signal from being generated during the idling stage of the process.

The electric discharge machining apparatus according to the invention can be used to cut workpieces and to form holes in a workpiece into which the wire shaped electrode is inserted.

As described above, in the electric discharge machining apparatus of the invention, the time instant when the end of the electrode 10 penetrates the workpiece 12 is detected from both the greatest machining depth state and at least one other factor, so that the machining operation may be automatically ended. Therefore, electric discharge machining conditions are stable and optimum at all times, and the configuration of a hole formed by the electric discharge machining apparatus is of high accuracy. Furthermore, it is unnecessary for the operator to carry out the aforementioned troublesome operation where he must watch the position of the electrode 10 relative to the workpiece 12 so as to visually detect when the electrode 10 penetrates the workpiece 12, which contributes to an improvement in work efficiency, to the economical use of the electrical discharge machining apparatus and to the realization of an automatic apparatus.

What is claimed is:

1. An electric discharge machining apparatus for machining a workpiece with an electric discharge, to form a throughhole in said workpiece, in which an electrode confronts said workpiece with a gap therebetween where the electric discharge is generated, comprising: an electrode position detecting means for detecting the position of said electrode during machining; and means for processing an output signal from said detecting means to produce an output signal representative of a detection factor; at least one further means for producing an output signal representative of a second detection factor, a time instant when an end of said electrode penetrates said workpiece being detected from a combination of said detection factors, and means for ending the machining after said penetration.

2. An electric discharge machining apparatus wherein an electrode confronts a workpiece to be machined with a gap therebetween, and where an electric discharge is caused to occur in said gap to thereby machine said workpiece, comprising: an electrode position detecting device for detecting the position of said electrode during machining; a machining depth decision circuit for processing an electrode position signal produced by said electrode position detecting device to thereby detect whether or not a given machining operation is that of the largest machining depth; and an electrode speed decision circuit for processing the electrode position signal from said electrode position detecting device to thereby detect the movement speed of said electrode, during the machining operation, a time instant when an end of said electrode penetrates said workpiece being detected from the largest machining depth state and the electrode moving speed, and means for ending the machining operation in response to said electrode penetration.

3. An electric discharge machining apparatus having a machining solution circulating device for supplying a machining solution into a gap formed by an electrode and a workpiece arranged in confronting relationship, wherein an electric discharge is caused to occur in said gap to thereby machine said workpiece, comprising: an electrode position detecting device for detecting the position of said electrode during machining; a machining depth decision circuit for processing an electrode position signal produced by said electrode position detecting device to thereby detect whether or not a given machining operation is that of the largest machining depth; a machining solution flow detecting device for measuring a supply flow of machining solution, and a machining solution flow decision circuit for determining the flow of the machining solution, during the machining operation, a time instant when an end of said electrode penetrates said workpiece being detected from the largest machining depth state and the machining solution flow, and means for ending said machining operation in response to said penetration detection.

4. An electric discharge machining apparatus having a machining solution circulating device for supplying a machining solution into a gap formed by an electrode and a confronting workpiece in which an electric discharge is caused to occur in said gap to thereby machine said workpiece, comprising: an electrode position detecting device for detecting the position of said electrode during machining; a machining depth decision circuit for processing an electrode position signal produced by said electrode position detecting device to thereby detect whether or not a given machining operation represents that of the largest machining depth; a machining solution pressure detecting device for detecting the pressure of the machining solution supplied by said machining solution circulating device; and a machining solution pressure decision circuit for determining the pressure of the machining solution during the machining operation, a time instant when an end of said electrode penetrates said workpiece being detected from the largest machining depth state, and the machining solution pressure, and means for ending said machining operation in response to said detection of said penetration.

5. An electric discharge machining apparatus as claimed in claims 1, 2, 3 or 4, wherein said means for ending machining comprises AND circuit means for generating a stop signal, and power supply control means receiving said stop signal.

6. An electric discharge machining apparatus as claimed in claim 1, wherein said processing means includes decision circuit means for determining the extent of the machining depth, and means for determining the speed of movement of said electrode.

7. An electric discharge machining apparatus as claimed in claim 6, wherein said detection factor comprises greatest current machining depth, said second detection factor comprising electrode movement speed.

8. An electric discharge machining apparatus as claimed in claim 6, wherein said decision circuit means and said speed determining means form separate inputs to AND circuit means for producing a machining process stop signal.

9. An electric discharge machining apparatus as claimed in claim 2, wherein the outputs of said speed decision circuit and said machining depth decision circuit are applied to AND circuit means for generating a stop signal, said stop signal being produced when said speed decision circuit indicates high speed movement of said electrode.

10. An electric discharge machining apparatus as claimed in claim 3, wherein an output of said flow decision circuit indicative of a relatively high flow comprises one of two detection factors for detecting penetration of said electrode.

11. An electric discharge machining apparatus as claimed in claim 4, wherein said machining operation ending means comprises AND circuit means for generating a stop signal when said machining depth decision circuit output indicates that a present machining depth is the largest machining depth and an output of said pressure decision circuit indicates relatively low machining solution pressure.

12. An electric discharge machining apparatus as claimed in claim 1, said at least one further means comprising electrode movement speed determining means, a machining solution flow determining means and a machining solution pressure determining means.

13. An electric discharge machining apparatus as claimed in claim 11, further comprising inverter means connected between said AND circuit means and said pressure decision circuit.

14. An electric discharge machining apparatus as claimed in claim 12, wherein the outputs of said further means form inputs to OR means, an output of said OR means forming one input of an AND circuit, a second input of said AND circuit comprising an output of said processing means.

15. An electric discharge machining apparatus as claimed in claim 14, wherein said means for ending machining comprises said AND circuit and power supply control means for receiving an output of said AND circuit.

16. An electric discharge machining apparatus as claimed in claim 1, wherein said at least one further means comprises an electrode movement speed determining means.

17. An electric discharge machining apparatus as claimed in claim 1, wherein said at least one further means comprises a machining solution flow determining means.

18. An electric discharge machining apparatus as claimed in claim 1, wherein said at least one further means comprises a machining solution pressure determining means.

* * * * *